United States Patent [19]
Diroll et al.

[11] Patent Number: 5,230,955
[45] Date of Patent: Jul. 27, 1993

[54] PLASTIC SHEET OR PLATE WITH FLAMEPROOFING MEANS

[75] Inventors: Otto Diroll, Darmstadt; Klaus Hofmann, Griesheim; Uwe Jacobsen, Darmstadt; Hans Lorenz, Darmstadt; Günther Schreyer, Darmstadt; Peter R. Szigeti, Buettelborn; Hermann Buchert, Bad Durkheim; Wolfgang Eberle, Mainz; Gerhard Heinz, Weissenheim/Berg; Eckhard Koch, Fussgoenheim, all of Fed. Rep. of Germany

[73] Assignees: Rohm GmbH Chemische Fabrik, Darmstadt; BASF Aktiengesellschaft, Ludwigshafen, both of Fed. Rep. of Germany

[21] Appl. No.: 672,329

[22] Filed: Mar. 20, 1991

[30] Foreign Application Priority Data

Mar. 20, 1990 [DE] Fed. Rep. of Germany ... 9003234[U]

[51] Int. Cl.$^5$ .................. B32B 5/16; B32B 27/00; B32B 9/04; C09K 19/00
[52] U.S. Cl. ........................... 428/332; 428/1; 428/246; 428/473.5; 428/524; 428/704; 428/920; 428/921
[58] Field of Search ............... 428/704, 920, 246, 332, 428/921, 473.5, 1, 524

[56] References Cited

U.S. PATENT DOCUMENTS

| | | | |
|---|---|---|---|
| 4,172,179 | 10/1979 | Yost | 428/516 |
| 4,943,473 | 7/1990 | Sahatjian et al. | 428/245 |
| 4,981,895 | 1/1991 | Buchert et al. | 524/408 |

FOREIGN PATENT DOCUMENTS

| | | |
|---|---|---|
| 0228041 | 7/1987 | European Pat. Off. |
| 0258189 | 3/1988 | European Pat. Off. |
| 0313171 | 4/1989 | European Pat. Off. |

*Primary Examiner*—Paul J. Thibodeau
*Assistant Examiner*—Leszek Kiliman
*Attorney, Agent, or Firm*—Oblon, Spivak, McClelland, Maier & Neustadt

[57] ABSTRACT

Thermoplastically re-formable plastic sheets with flameproofing means, characterized by a core layer 1–10 mm thick comprised of polyether sulfone or a similar thermoplastic, which core material has a content of at least 0.5 wt. %, preferably at least 2 wt. %, of a flame-protective additive, such as boron trioxide; and said sheet or plate further characterized by outer layers, firmly adhering to and covering the two faces of the core layer, at least 0.05 mm thick and comprised of a thermoplastic having a lower proportional content of the flame-protective additives than the core layer; are particularly useful for interior structures in passenger conveyances, such as airplanes.

4 Claims, No Drawings

PLASTIC SHEET OR PLATE WITH FLAMEPROOFING MEANS

BACKGROUND OF THE INVENTION

1. Field of the Invention

The present invention relates to a thermoplastically re-formable plastic sheet or plate with flameproofing means, useful for interior structures in passenger vehicles, passenger ships, and passenger aircraft, and for producing structural elements suitable for installation in such conveyances.

2. Discussion of the Background

Experience has shown that the time required to evacuate large capacity conveyances, such as airplanes, in the case of fire is so lengthy that the health and life of the passengers are at hazard. Therefore, materials are used in interior structures of such conveyances which do not present additional hazards for the passengers. Such materials should exhibit a minimal emission of heat, smoke, and toxic gases during fires, and the onset of any such emissions should be delayed as long as possible.

In the past a number of thermoplastic plastic materials such as ABS, PC, or PES have been used for interior structures of aircraft. These materials release substantial heat immediately after ignition. Moreover, ABS emits substantial smoke. Therefore these plastics are no longer acceptable for interior structures of aircraft.

The U.S. Federal Aviation Authority, in coordination with the aircraft manufacturers, has established, e.g., the following requirements relating to measurement methods and limiting values of parameters, for the testing of the suitability of materials for interior structures of aircraft:

TABLE

| Parameter | Measured value | Units | Prescribed maximum |
|---|---|---|---|
| Heat evolution | HRR | kW/m$^2$ | 65 |
| FAR 25,853 (OSU) | HR | kW-min/m$^2$ | 65 |
| Density of evolved smoke | D$_s$ (4 min) | | 100 |
| Toxic gases | CO | ppm | 3,500 |
| | SO$_2$, H$_2$S | ppm | 100 |

Thermoplastics modified with flame-protective additives according to DE-A 38 29 712 (corresponds to U.S. Pat. No. 4,981,895, incorporated herein by reference) meet these fire regulations. The additives improve the combustion properties in the OSU chamber test. In comparison to ABS, PC, and PES, plastics modified with the additives substantially improve the fire safety of passengers when said plastics are used in the inner structures of passenger conveyances. Accordingly, such modified plastics are used in large amounts in the aircraft industry.

Nonetheless, these modified plastics have certain disadvantages. The impact strength (Gardner) of sheets comprised of the modified plastics decreases with increasing content of the flame-retardant additives. In addition, the HRR values determined in the OSU test still appear to be close to the maximum permissible values, particularly in the case of 2-5 mm thick sheets, which are particularly important in interior construction. Furthermore, some of the additives used, particularly boron trioxide, form undesirable deposits or efflorescences or blooms on the surface of the sheets.

SUMMARY OF THE INVENTION

Accordingly, it is one object of the present invention to provide novel plastic materials which pass the OSU test and have high impact strength.

It is another object of the present invention to provide plastic materials which pass the OSU test and which also exhibit sufficient mechanical strength to be used as thin sheets.

It is another object of the present invention to provide plastic materials which result in a reduction of the heat evolved in burning as measured by the OSU test.

It is another object of the present invention to provide plastic materials which pass the OSU test and exhibit a reduced amount of bloom formation on the surface.

These and other objects, which will become apparent during the following detailed description, have been achieved by the inventors' discovery that multilayer plastic sheets or plates, comprising: (i) of a core layer 1-10 mm thick comprising a thermoplastic with a content of at least 0.5 wt. %, preferably at least 2 wt. %, based on the weight of the core layer, of a flame-protective additive; and (ii) outer layers firmly adhering to and covering the two faces of the core layer, which outer layers are at least 0.05 mm thick and which comprise a thermoplastic having a lower proportional content of the flame-protective additives than does the core layer; possess excellent combustion and mechanical properties. Preferably the outer layers contain no flame-protective additives.

DETAILED DESCRIPTION OF THE PREFERRED EMBODIMENTS

The effect of the outer layers is surprising. It was found, surprisingly, that not only were the OSU test results for the present composites, comprised of a core layer of plastic with flame-protective additives and outer layers of pure plastic, superior to the results for homogeneous sheets or plates comprised of the pure plastic, but they were also superior to the results for homogeneous sheets or plates of plastic containing the additive. The combustion which occurred was controlled, with carbonization of the surface, which led to decreased flowing and decreased bubble formation under the action of an applied fire. Most surprising was the fact that no reduction of impact strength (determined according to Gardner) could be detected, as would be expected due to the content of flame-protective additives in the present multilayer sheets or plates.

The advantageous properties may be seen from the comparison tests described hereinbelow. In the tests, polyether sulfone (PES) was used as the thermoplastic, and boron trioxide was used as the flame-protective additive.

The comparison tests were carried out on the following materials:

A) Single-layer extruded sheet comprised of pure PES;
B) Single-layer extruded sheet comprised of PES with 3 wt. % B$_2$O$_3$+8 wt. % TiO$_2$ (according to DE-A 38 29 712); and
C) Three-layer co-extruded sheet with a core layer comprised of a plastic according to (B) and outer layers adhering to said core layer on both faces of the latter, which outer layers are comprised of pure PES.

TABLE 1

| Heat release rate (HRR) according to FAR 25.853 (OSU test): | | | | |
|---|---|---|---|---|
| | HRR (kW/m$^2$) Sheet thickness (mm): | | | |
| Material | 1.5 | 2.0 | 2.5 | 3.0 |
| A | 56 | 65 | 78 | 88 |
| B | 37 | 48 | 53 | 56 |
| C | 41 | 47 | 50 | 51 |

TABLE 2

| Gardner impact strength test: | | | | |
|---|---|---|---|---|
| | Sheet thickness (mm): | | | |
| Material | 1.5 | 2.0 | 2.5 | 3.0 |
| A | >18 | >18 | >18 | >18 |
| B | 8 | 10 | 14 | 16 |
| C | >18 | >18 | >18 | >18 |

The outer layers with low or preferably zero content of additives (e.g., boron trioxide) serve to effectively prevent efflorescence.

The flameproofed sheets or plates according to the invention are advantageously produced by techniques of multilayer co-extrusion in which at least 3 layers are co-extruded. These techniques are per se known. The core layer may itself be comprised of a plurality of layers.

Preferably the thickness of the sheets or plates is 0.5–20 mm, particularly preferably 0.8–5 mm. Sheets in the range 1–3 mm thick are of particular practical interest for aircraft construction.

The outer layers may be 0.05–2 mm thick, preferably 0.1–1.0 mm. Outer layers <0.1 mm thick have been found to be relatively ineffective in many cases, with the combustion behavior corresponding to the behavior of the pure core layer. A reduction of the OSU test value is always observed with outer layers at least 0.1 mm thick each, and particularly at least 0.15 mm thick. OSU test values decrease further as the thickness of the outer layer increases, up to an outer layer thickness of 0.25 mm.

The thermoplastic of which the core and outer layers are comprised should be extrudable, and should be susceptible to thermoplastic and/or thermoelastic deformation of the extruded sheets or plates comprised of the material. It should have high thermal stability. Advantageously, its Vicat softening temperature is in the range 150°–250° C. The extended use temperature of the material (according to UL 746 B) should be >130° C., preferably >150° C. In the case of fire, it should have low smoke emission density, and should form minimal or no toxic combustion gases. These requirements are met by a number of engineering thermoplastics which have as a common feature aromatic groups, particularly phenylene groups, in their main chain. Known representatives of this group of thermoplastics are polyether sulfones (PES), polyether imides (PEI), polyaryl ether ether ketones (PEEK), polyphenylene sulfides (PPS), thermoplastic polyimides (PI), polyamideimides (PAI), and self-reinforcing liquid crystal polymers (LCP).

Short descriptions of these plastics and methods by which they can be produced are found in Franck, A., and Biederbick, K., *Kunststoff-Kompendium*, 2nd, Ed., pub. Vogel Buchverlag, Würzberg (1988). Typical structures of such plastics are presented in the formulae shown below:

Typical Formulae:

Polyether sulfones

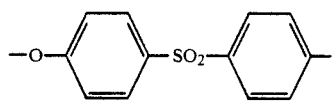

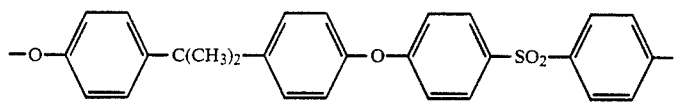

Polyether ketones, e.g.:

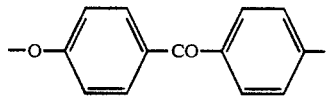

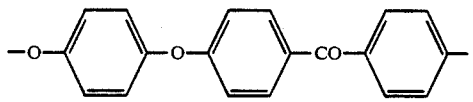

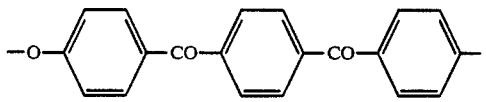

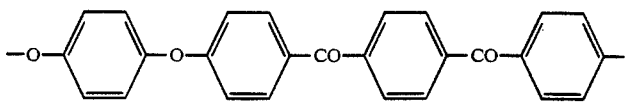

-continued
Typical Formulae:

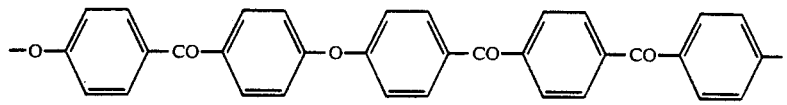

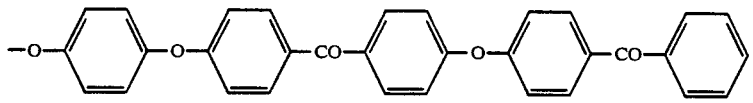

Polyether imide

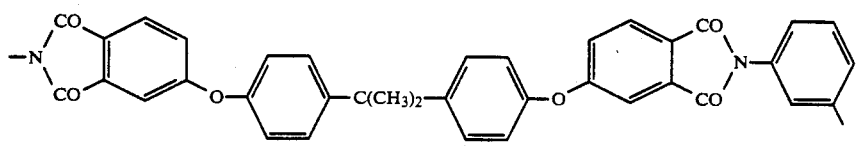

Polyphenylene sulfide

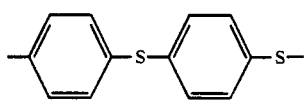

Thermoplastic polyimides

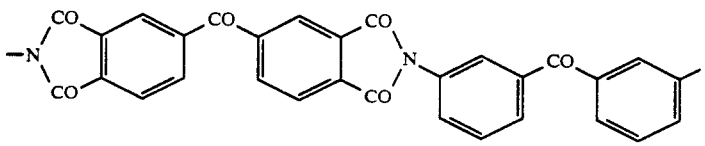

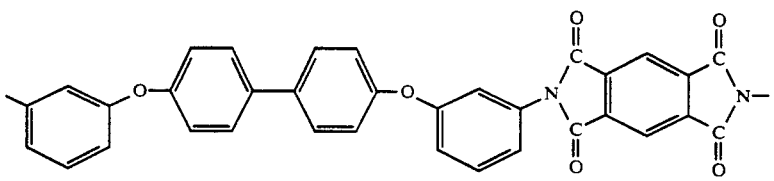

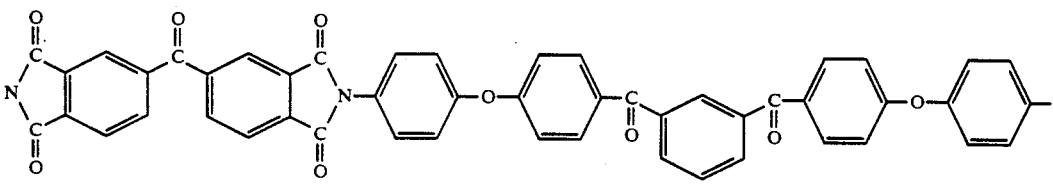

Thermoplastic polyamideimides

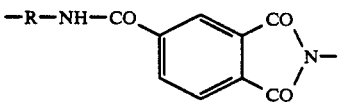

Preferred plastics are polyether sulfones. These are to be understood as a class of polycondensate plastics belonging to the polysulfones, the members of which are comprised of bifunctional aromatic groups, particularly phenylene groups, joined by ether and sulfone bridges. In the following, these are designated as "PES", in accordance with DIN 7728 T. PES are thermoplastic, thermally stabile, and self-extinguishing. For the purposes of the invention, PES with a melt viscosity suitable for extrusion are employed; the melt volume index at 360° C./10Kp is, e.g., approximately 30 cm³/10 min.

The preferred plastics are comprised of recurring units of general structural formula —(Ar—SO$_2$—Ar—O)$_n$—, where Ar represents a bifunctional mononuclear or polynuclear aromatic group, chosen such that the required melt viscosity is achieved. Preferably the groups Ar comprise p-phenylene groups, which may contain substituents such as lower alkyl groups or cycloalkyl groups. Polynuclear groups Ar may contain, e.g., two such phenyl groups which may be directly connected or may be linked via an oxygen or sulfur atom or by —SO$_2$—, methylene, or isopropylidene groups.

The core and outer layers may be comprised of different plastics. However, it is advantageous if the outer layers contain the same thermoplastic plastic as the core layer, except for the content of flame-protective additives. As a rule the outer layers have zero content of flame-protective additives. There may be a small amount of such additives, not greater than 0.5 wt. %, e.g., if the additives diffuse to a small extent from the core into the outer layers under the conditions of co-extrusion, or if a small amount of recycled sheet or plate material is used in producing the outer layers.

The most favorable mechanical properties are achieved when the outer layers are completely free of flame-protective additives. Where a certain extent of degradation of favorable mechanical properties is tolerable, a certain amount of flame-protective additives may be incorporated in the outer layers. Preferably this amount is much less than 1 wt. %, particularly preferably <0.5 wt. %, based on the weight of the outer layers.

The core layer contains an effective amount of flame-protective additive, which amount is determined such that the multilayer sheet or plate passes the OSU combustion test. The amount of additives is at least 0.5 wt. %, preferably at least 2 wt. %, particularly preferably 2.5–15 wt. %, based on the weight of the core layer.

Flame-Protective Additives

Within the context of the invention, all materials which inhibit heat evolution under combustion conditions and which do not liberate toxic gases or vapors upon burning are regarded as "flame-protective additives". Particularly suitable additives are inorganic materials which when cooled from a molten state undergo a transition to an amorphous vitreous state and in the process form a planar network structure or three-dimensional network structure. The molten plastic is wetted and is coated with a layer of decomposed additive material.

The additives should have a melting point between 300° and 1400° C., preferably between 350° and 1200° C., particularly preferably between 400° and 1000° C., or else when subjected to fire should be converted into materials with such a melting point. Examples of such additives are oxides of elements of groups III-B to V-B of the periodic table, and salts of oxygen acids of such elements. Preferred salts are Na, K, Ca, Zn, and Al salts. Hydroxides and carbonates of the mentioned elements may be converted into oxides with the prescribed properties, under fire conditions. Also, mixtures of a plurality of additives may be employed.

Examples of suitable additives are $B_2O_3$, $NaBO_2$, $Na_2B_4O_7$, $Ca(BO_2)_2$, $Zn(BO_2)_2$, $Zn_2B_2O_{11}$, $P_2O_5$, $Na_4P_2O_7$, $NaPO_3$, $Ca(PO_3)_2$, $Zn_3(PO_4)_2$, $Sb_2O_3$, $Sb_2O_5$, $Na_3SbO_4$, $Na_2SiO_3$, $Na_2O-CaO-6SiO_2$, $K_2O-Al_2O_3-6SiO_2$ (feldspar), $Na_2O-Al_2O_3-6SiO_2$ (zeolite), and other silicates.

Other additives may be present in the outer layers and the core layer, which further reduce the HRR values; e.g., magnesium hydroxide. In addition, the combustion properties are favorably influenced by the presence of titanium dioxide in the outer and core layers, e.g., in an amount of 5–10 wt. %.

A preferred flame-protective additive, particularly for addition to PES, is boron trioxide. If the core layer is at most 2 mm thick, a content of 2 wt. % boron trioxide is sufficient. If the core layer is >2 mm thick, a content of boron trioxide of at least 2.5 wt. %, e.g., 3 wt. %, is advantageous. Preferably the core layer also contains titanium dioxide. The outer layers may contain 1–12 wt. % of a white pigment.

The novel sheets and plates may advantageously be manufactured by co-extrusion of the three layers. The surface of the extruded sheet may be smoothed or textured in a calendering apparatus. To produce formed pieces, the extruded planar sheets or plates may be heated to softening and may be formed by vacuum and/or a drawing punch, on a forming apparatus.

Other features of the invention will become apparent in the course of the following descriptions of exemplary embodiments which are given for illustration of the invention and are not intended to be limiting thereof.

EXAMPLES

Example 1

In two separate extruders,
-- PES (commercial product Ultrason ® E 3000 Q 12, of BASF AG) with a content of 3 wt. % $B_2O_3$ and 8 wt. % $TiO_2$, along with pigments, for the core layer, and
-- pure (other than a small amount of pigments) PES, for the outer layers, were melted, heated to 350° C., and were combined into a three-layered intermediate extrudate with the use of a co-extrusion adapter. This extrudate was further extruded to a 1.5–3 mm thick sheet, using an adjustable slit nozzle. The sheet was fed to a calender where it was smoothed or impressed on one or both sides, and the sheet was cooled to below 226° C. The two outer layers of the sheet were each 0.2 mm thick, and the core layer between them was 1.1–2.6 mm thick. The sheet was cut into sheet goods of conventional commercial size, using a cutting apparatus.

The fire behavior in the OSU test in comparison to single-layer sheets comprised of pure PES and sheets comprised of the above-described mixture is given in tabular form hereinabove in the Specification.

Example 2

Using the method described in Example 1, 3 mm thick sheets were produced by co-extrusion, which sheets had a core layer of PES with a content of 3 wt. % $B_2O_3$ and 8 wt. % $TiO_2$, and some of which had co-extruded outer layers comprised of pure PES. The following values were obtained in the OSU test, each of which represents the mean of 5 individual measurements:

| Thickness of the outer layers (mm) | OSU test results: | |
|---|---|---|
| | HRR ($kW/m^2$) | HR ($kW-min/m^2$) |
| 0.0 | 60–65 | <10 |
| 0.06–0.08 | 71 | 4 |
| 0.10–0.12 | 37 | 3 |
| 0.15–0.17 | 47 | 7 |
| 0.20–0.22 | 49 | 9 |

If for the outer layers one uses PES which also contains 8 wt. % $TiO_2$ one obtains the following OSU test results:

| Thickness of the outer layers (mm) | OSU test results: | |
|---|---|---|
| | HRR ($kW/m^2$) | HR ($kW-min/m^2$) |
| 0.0 | 60–65 | <10 |
| 0.06–0.08 | 66 | 3 |
| 0.10–0.12 | 59 | 4 |
| 0.15–0.17 | 48 | 5 |
| 0.20–0.22 | 45 | 10 |

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A re-formable plastic sheet or plate, comprising (i) a core layer, 1–10 mm thick, of a thermoplastic with two faces and comprising at least 0.5 wt. % of a flame-protective additive wherein said flame-protective additive has a melting point between 300° and 1400° C., or is converted into a material with a melting point between 300° and 1400° C., when subjected to fire and (ii) outer layers firmly adhering to and covering said faces of said core layer, which outer layers are 0.10–1.00 mm thick and are layers of a thermoplastic which is essentially free of said flame-protecting additive or has a lower percentage content of said flame-protective additive than said core layer wherein said outer layers are formed of the same thermoplastic as said core layer, except for the content of said flame-protective additive, and wherein the thermoplastic is selected from the group consisting of polyether sulfones (PES), polyether imides (PEI), polyaryl ether ether ketones (PEEK), polyphenylene sulfides (PPS), thermoplastic polyimides (PI), polyamideimide (PAI), and self-reinforcing liquid crystal polymers (LCP), which plastic sheet or plate is characterized by an HRR value of not more than 65 kW/m$^2$ and an HR value of not more than 65 kW-min/m$^2$ as determined by the OSU test and by an impact strength (Gardner) of at least 18.

2. The re-formable plastic sheet or plate of claim 1, wherein the outer layers contain less than about 0.5 wt. % of flame-protective additive.

3. A re-formable plastic sheet or plate comprising (i) a core layer, 1–10 mm thick, of a thermoplastic with two faces and comprising at least 0.5 wt. % of a flame-protective additive wherein said additive is an oxide, hydroxide or carbonate of an element of group III--B, IV-B, or V-B of the periodic table, or a salt of an oxygen acid of an element of group III-B, IV-B, or V-B of the periodic table and (ii) outer layers firmly adhering to and covering said faces of said core layer, which outer layers are 0.10–1.00 mm thick and are layers of a thermoplastic which is essentially free of said flame-protecting additive or has a lower percentage content of said flame-protective additive than said core layer wherein said outer layers are formed of the same thermoplastic as said core layer, except for the content of said flame-protective additive, and wherein the thermoplastic is selected from the group consisting of polyether sulfones (PES), polyether imides (PEI), polyaryl ether ether ketones (PEEK), polyphenylene sulfides (PPS), thermoplastic polyimides (PI), polyamideimide (PAI), and self-reinforcing liquid crystal polymers (LCP), which plastic sheet or plate is characterized by an HRR value of not more than 65 kW/m$^2$ and an HR value of not more than 65 kW-min/m$^2$ as determined by the OSU test and by an impact strength (Gardner) of at least 18.

4. A re-formable plastic sheet or plate comprising (i) a core layer, 1-10 mm thick of a polyether sulfone with two faces and comprising at least 0.5 wt. % of a flame-protective additive which is boron trioxide and (ii) outer layers firmly adhering to and covering said faces of said core layer, which outer layers are 0.10–1.00 mm thick and are layers of polyether sulfone which are essentially free of flame-protecting additive or have a lower percentage content of flame-protective additive than said core layer, which plastic sheet or plate is characterized by an HRR value of not more than 65 kW/m$^2$ and an HR value of not more than 65 kW-min/m$^2$ as determined by the OSU test and by an impact strength (Gardner) of at least 18.

* * * * *